S. FOX.
MOTOR CUSHIONING DEVICE.
APPLICATION FILED MAY 7, 1918.

1,325,937.

Patented Dec. 23, 1919.

INVENTOR
Samuel Fox
BY
John A Bergstrom
ATTORNEY

UNITED STATES PATENT OFFICE.

SAMUEL FOX, OF NEW YORK, N. Y.

MOTOR-CUSHIONING DEVICE.

1,325,937.  Specification of Letters Patent.  Patented Dec. 23, 1919.

Original application filed October 16, 1917, Serial No. 196,810. Patent No. 1,284,640, dated November 12, 1918. Divided and this application filed May 7, 1918. Serial No. 233,034.

*To all whom it may concern:*

Be it known that I, SAMUEL FOX, a citizen of the United States, and resident of New York, in the county of Bronx and State of New York, have invented certain new and useful Improvements in Motor-Cushioning Devices, of which the following is a specification.

This invention relates to a cushioning device for motors adapted to drive the tool of a shoe polishing machine and is a division of my U. S. Patent No. 1,284,640, granted to me Nov. 12, 1918.

The object of the invention is to provide a machine for polishing shoes in which a motor is carried in a casing, and a cylindrical brush is rotated by the motor.

The invention is designed to provide means for absorbing the vibrations communicated to the casing by the motor when running at a high rate of speed.

The invention includes a resilient spring member secured in the casing on to which the motor is mounted.

The novel features of the invention are more fully described in the following specifications and claims, and illustrated in the accompanying drawing in which:—

Figure 1:
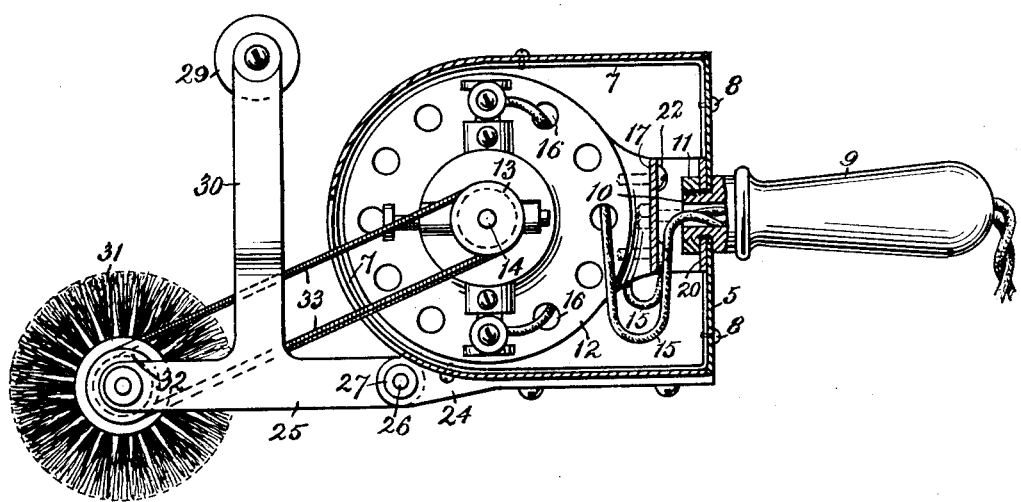
Figure 1 represents a sectional side elevation of a machine embodying this invention.
Figure 2:
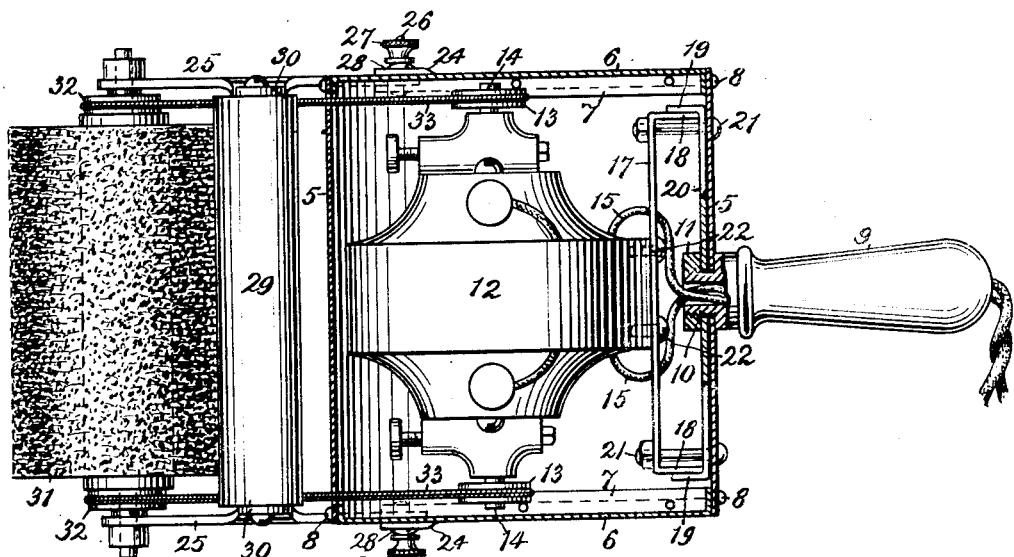
Fig. 2 is a horizontal longitudinal section of the same.
Figure 3:
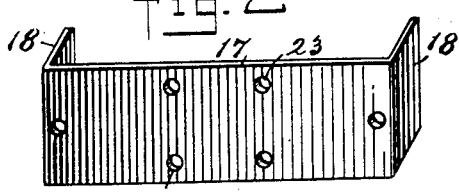
Fig. 3 is a detached perspective view of the spring support.

In this drawing the numeral 5 designates a casing the front portion thereof being preferably semicircular as indicated in Fig. 1, so that it will conform with the contour of the motor. The side portions 6 of the casing are made in the shape of covers having inwardly turned flanges 7 to engage the body of the casing and fastened thereto by screws 8. The object of this construction is that the screws can be removed, so that either side can be taken out to give access to the interior of the casing for repairing or adjusting the motor.

The casing 5 has a hollow handle 9 with a threaded end 10 projecting into the casing. The end is engaged by a nut 11 for rigidly holding the handle to the wall of the casing.

An electric motor 12 having a pulley 13 on each side is arranged in the casing. These pulleys are mounted on the rotor shaft 14 of the armature and revolve when the motor is in action. The motor is provided with the usual terminals 15 passing through holes 16 of the motor frame and through the hollow handle 9 to a socket or other source of electric energy as well known. The motor is mounted on a spring support 17 extending across the casing having rearwardly bent ends 18 to engage the forwardly bent ends 19 of a strap 20 fastened to the casing 5 by nut 11 on the hollow handle 9. The spring support 17 is fastened at each end to the casing 5 by bolts 21 which pass through the strap 20. The bent ends 18 of the spring support 17 abut the inside portions of the strap 20 thereby holding the spring support 17 in secure position.

The motor 12 is fastened to the center of the spring support 17 by screws 22 which pass through holes 23 of said spring support. This construction practically constitutes a resilient cushion device to take up any jars or shocks given to the motor, and otherwise transmitted to the casing.

A pair of bifurcated ears or lugs 24 one being opposite the other, project from the lower portions of the casing. Each ear is engaged by an arm 25 located on each side of the casing. A bolt 26 extends through eyes in the ear and arm, and a nut 27 coacting with a spring 28 connects the parts together. The bifurcated ends of the ear will frictionally engage the tongue of the arm when the nut is tightened, thus preventing unnecessary movement of the arm. A handle 29 is mounted on two vertical uprights 30 forming contiguous portions of the arms.

A cylindrical brush 31 having a pulley 32 at each end is rotatively mounted on a shaft fixed between the forward portions of the arms. Elastic belts 33 in engagement with the pulleys 13 and 32 connect the motor with the brush. These belts are preferably made of coiled spring wire as shown and take up any slack between the motor and the brush caused by the adjustment of the arms 25 or otherwise.

As indicated in the drawing, the arms 25 can swing about the bolt 26, to set or position the brush at an angle to glide over any curvature of the shoe. The device is portable being manipulated by the handle 9, while the position of the brush relative to the shoe can be adjusted by the handle on the arms. It will be seen that when the nut 11 is tightened it will hold the strap against the inner portion of the casing, while the bolts 21 passing through holes in the strap prevent it from turning about the stem of the handle. The bent ends 18 and 19 of the strap and resilient support are parallel and over-lap each other so that when there is any lateral movement of the motor the shock will be taken up by the rigid ends of the strap.

I claim:—

1. A cushioning device comprising a casing, a resilient support having bent ends arranged in the casing, a strap having bent ends parallel with the ends of the support, means engaging the strap and support for fastening them in the casing, and a motor mounted on the support.

2. A cushioning device comprising a casing, a resilient support having bent ends arranged in the casing, a strap having bent ends parallel with and over-lapping the ends of the support, means engaging the strap and support for fastening them in the casing, and a motor mounted on the support.

3. A cushioning device comprising a casing, a resilient support having bent ends arranged in the casing, a strap having bent ends parallel with and over-lapping the ends of the support, bolts passing through the support, strap and casing for securing them in the casing, and a motor mounted on the support.

4. A cushioning device comprisng a casing, a resilient support having bent ends arranged in the casing, a strap with bent ends to coact with the ends of the support, means for fastening the support in the casing, a handle having a threaded end projecting through a portion of the strap, and a nut engaging the thread to fasten the strap to the casing.

Signed at New York, in the county of New York and State of New York this 27th day of April A. D. 1918.

SAMUEL FOX.

Witnesses:
  GRACE DE VOE,
  WILLIAM MILLER.